United States Patent
Tamura

(10) Patent No.: US 8,533,262 B2
(45) Date of Patent: *Sep. 10, 2013

(54) INFORMATION PROCESSING APPARATUS, AND CONTROL METHOD OF INFORMATION PROCESSING APPARATUS, AND PROGRAM

(75) Inventor: Makiya Tamura, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/585,732

(22) Filed: Aug. 14, 2012

(65) Prior Publication Data

US 2012/0311028 A1    Dec. 6, 2012

Related U.S. Application Data

(63) Continuation of application No. 12/863,310, filed as application No. PCT/JP2010/003720 on Jun. 3, 2010.

(30) Foreign Application Priority Data

Jun. 25, 2009    (JP) .................................. 2009-151480

(51) Int. Cl.
    *G06F 15/16*    (2006.01)
(52) U.S. Cl.
    USPC .......................................... 709/203; 709/204
(58) Field of Classification Search
    USPC ................................................ 709/203, 204
    See application file for complete search history.

(56) References Cited

U.S. PATENT DOCUMENTS

| 2005/0105129 A1 | 5/2005 | Takahashi |
| 2006/0077423 A1 | 4/2006 | Mathieson |
| 2009/0083286 A1 | 3/2009 | Tamura |
| 2010/0042795 A1 | 2/2010 | Uchida |

FOREIGN PATENT DOCUMENTS

| JP | 2000-235437 | 8/2000 |
| JP | 2005-167988 | 6/2005 |
| JP | 2006-127503 | 5/2006 |
| JP | 2008-065650 | 3/2008 |
| WO | 2008-139545 | 11/2008 |

*Primary Examiner* — Adnan Mirza
(74) *Attorney, Agent, or Firm* — Fitzpatrick, Cella, Harper & Scinto

(57) ABSTRACT

In an information processing apparatus which is connected to a Web server and includes a Web browser for displaying an operation screen provided by the Web server: a request is transmitted to the Web server on the basis of a user operation performed through the operation screen displayed on the Web browser; if it is requested by the Web server to perform a process on the basis of the transmitted request, the requested process is performed; if the process requested by the Web server is being performed, the transmitted request is not invalidated; and, if the process requested by the Web server is not performed, the transmitted request is invalidated according to that there is no response from the Web server and a predetermined time out period elapses after the transmission of the request.

7 Claims, 10 Drawing Sheets

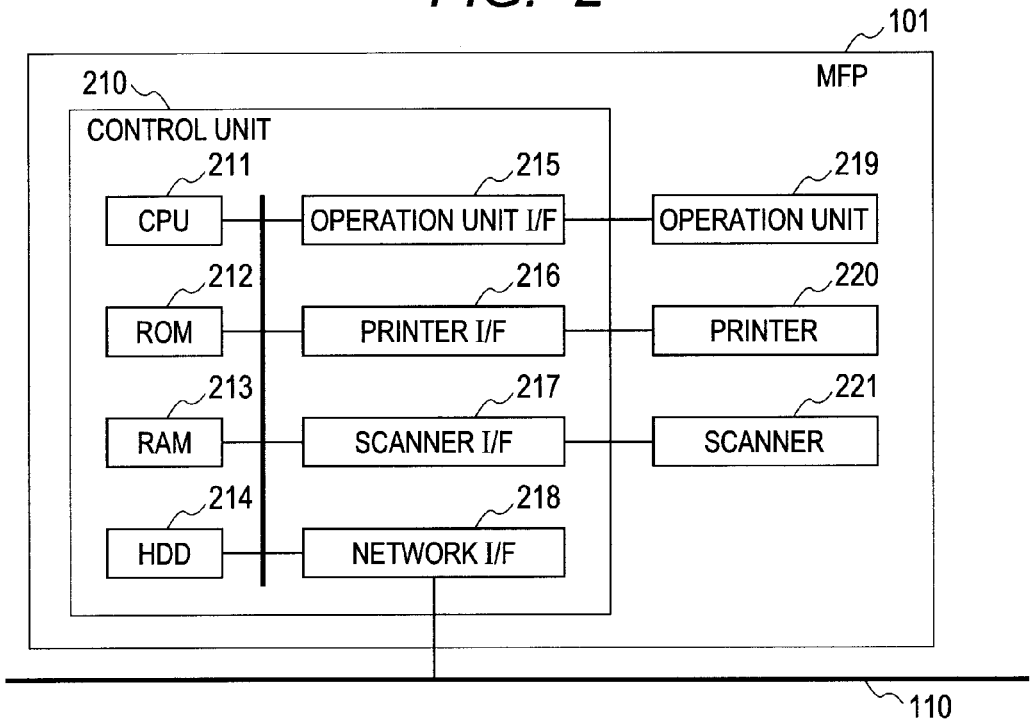
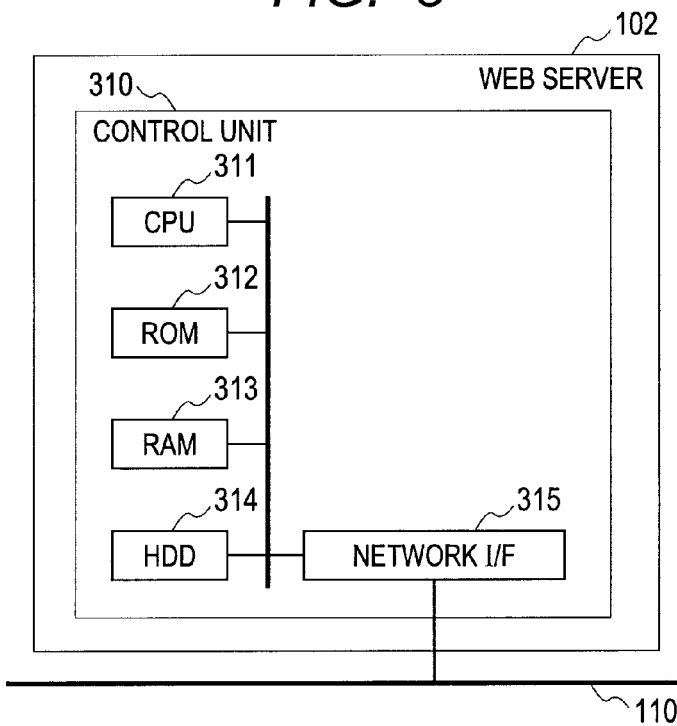

INFORMATION PROCESSING APPARATUS, AND CONTROL METHOD OF INFORMATION PROCESSING APPARATUS, AND PROGRAM

This application is a continuation of Application Ser. No. 12/863,310, filed Jul. 16, 2010 (allowed), which is a national stage application under §371 of International Application No. JP2010/003720, filed on Jun. 3, 2010, which claims priority to Japanese Application No. 2009-151480, filed on Jun. 25, 2009, the contents of each of which is incorporated by reference herein.

TECHNICAL FIELD

The present invention relates to an information processing apparatus which is connected to a Web server and has a Web browser for displaying an operation screen provided by the Web server, a control method of the information processing apparatus, and a program for causing a computer to perform the control method.

BACKGROUND ART

It is known that an information processing apparatus such as a PC (personal computer) or the like is connected to a Web server located on a network and an operation screen provided by the Web server is displayed on a Web browser of the information processing apparatus.

In such a case, the Web browser of the information processing apparatus requests the operation screen to the Web server, and then a Web application on the Web server returns to the information processing apparatus a response with an HTML (Hyper Text Markup Language) file for causing the Web browser to display the operation screen in response to a request from the information processing apparatus. Then, the Web browser of the information processing apparatus analyzes the received HTML file, and thus displays the operation screen based on descriptions of the HTML file.

Besides, if a user inputs an instruction through the operation screen displayed on the Web browser, the Web browser notifies the Web server of the input instruction. Then, the Web application on the Web server, which received such a notification, performs a process according to the input instruction.

By the way, recently, there are many kinds of MFPs (Multi Function Peripherals) each of which has a scanner and a printer. Among these MPFs, there are some kinds of MFPs each of which is equipped with such a Web browser as described above. Then, the MFP like this displays an operation screen provided by a Web server on the Web browser of the relevant MFP according to such a procedure as described above, and thus accepts various instructions from a user.

CITATION LIST

Patent Literature
[PTL 1]
Japanese Patent Application Laid-Open No. 2006-127503

Further, a technique as disclosed in Patent Literature 1 has been thought. That is, according to the description in Patent Literature 1, a Web server provides an operation screen for inputting instructions to use respective functions provided in an MFP. Namely, a user of the MFP inputs the instruction to the MFP through the operation screen provided by the Web server and displayed on a Web browser. Then, the Web browser of the MFP notifies the Web server of the input instruction.

Next, the Web server, which received such a notification, requests the MFP to perform various processes according to the contents of the instructions input by the user. Then, the MFP, which accepted such a request, performs the requested process. Thus, it is unnecessary to hold, in the MFP, all menu data for operating the MFP. Further, it is possible to easily change the menu data on the Web server.

Typically, in a case where the Web application on the Web server performs the process on the basis of the instruction input through the operation screen displayed on the Web browser, a new operation screen is displayed on the Web browser according to completion of the process by the Web application. That is, when the process by the Web application is completed, the Web server generates HTML data for the operation screen for notifying a user of the completion of the process or the operation screen for causing a user to perform a next operation. Then, the Web server transmits to the Web browser the generated HTML data as a response to the request transmitted from the Web browser.

On the other hand, there is a case where, in regard to the Web browser installed in the information processing apparatus such as a PC, a MFP or the like, a time limit (time out period) until reception of a response from the Web server after transmission of a request to the Web server has been set. Then, if there is no response from the Web server within the time out period, the Web server performs a time out process. Here, it should be noted that the time out process is a process to invalidate the transmitted request. Namely, if the transmitted request is invalidated, for example, it is possible to stop waiting for the response to the transmitted request. Thus, it is possible to set a state of enabling to transmit a new request. Also, at this time, there is a case where a process to discard a session itself to release resources of the Web browser.

However, as disclosed in above-described Patent Literature 1, in the case where the MFP transmits the request to the Web server based on the operation performed by the user through the operation screen displayed on the Web browser of the MFP and then the Web server requests the MFP to perform the process based on the request transmitted from the MFP, such a problem as described below is conceivable.

That is, in the constitution as disclosed in Patent Literature 1, a result of the process performed by the MFP is once notified to the Web server. Then, the Web server, which received such a notification, transmits to the Web browser the HTML data necessary to notify the processed result, as a response to the request first received from the Web browser. At this time, if it takes a time for the MFP to perform the process based on the request from the Web server, a long time is necessary from Web server's reception of the request from the Web browser to return of the response to the Web browser. Therefore, if the above time out process is performed by the Web browser, the response returned from the Web server is not normally received by the Web browser. Thus, it is impossible to notify the user of the result of the process performed by the MFP.

DISCLOSURE OF INVENTION

The present invention has been completed in consideration of such a problem as described above, and aims to provide a mechanism of not invalidating, in a case where a process requested by a Web server is being performed, a request transmitted by a Web browser.

To achieve this, the present invention is characterized by providing an information processing apparatus, which is connected to a Web server and includes a Web browser for displaying an operation screen provided by the Web server, comprising: a transmission unit configured to transmit a request to the Web server on the basis of a user operation performed through the operation screen displayed on the Web browser; a processing unit configured to, in a case where it is requested by the Web server to perform a process on the basis of the request transmitted by the transmission unit, perform the requested process; and a control unit configured to, in a case where the processing unit is performing the process requested by the Web server, not invalidate the request transmitted by the transmission unit, and to, in a case where the processing unit does not perform the process requested by the Web server, invalidate the request transmitted by the transmission unit according to that there is no response from the Web server and a predetermined time out period elapses after the transmission unit transmits the request.

Further features of the present invention will become apparent from the following description of exemplary embodiments with reference to the attached drawings.

BRIEF DESCRIPTION OF DRAWINGS

FIG. 1 is a diagram illustrating the whole of an information processing system according to embodiments of the present invention.
[FIG. 2]
FIG. 2 is a block diagram illustrating a constitution of an MFP 101 according to the embodiments of the present invention.
[FIG. 3]
FIG. 3 is a block diagram illustrating a constitution of a Web server 102 according to the embodiments of the present invention.
FIG. 4 is a block diagram illustrating a software configuration of the information processing system according to the embodiments of the present invention.
FIG. 5 is a diagram illustrating a session/service management unit 440 according to the embodiments of the present invention.
FIG. 6 is a sequence diagram for describing a series of processes to be performed by a Web browser 430, a Web server 102 and a service provider 450.
FIG. 7 is a flow chart for describing the operation of the Web browser 430 according to the embodiment of the present invention.
FIG. 8 is a flow chart for describing the operation of the service provider 450 according to the embodiment of the present invention.
FIG. 9 is a flow chart for describing the operation of the Web browser 430 according to the embodiment of the present invention.
FIG. 10 is a flow chart for describing the operation of the service provider 450 according to the embodiment of the present invention.
FIG. 11 is a flow chart for describing the operation of the Web browser 430 according to the embodiment of the present invention.

DESCRIPTION OF EMBODIMENTS

Hereinafter, exemplary embodiments of the present invention will be described in detail with reference to the attached drawings. By the way, it should be noted that the following embodiments do not limit the scope of the invention as described in the appended claims, and that all the combinations of the features described in the embodiments are not necessarily indispensable to the solution of the invention.

[First Embodiment]

Figure 1:
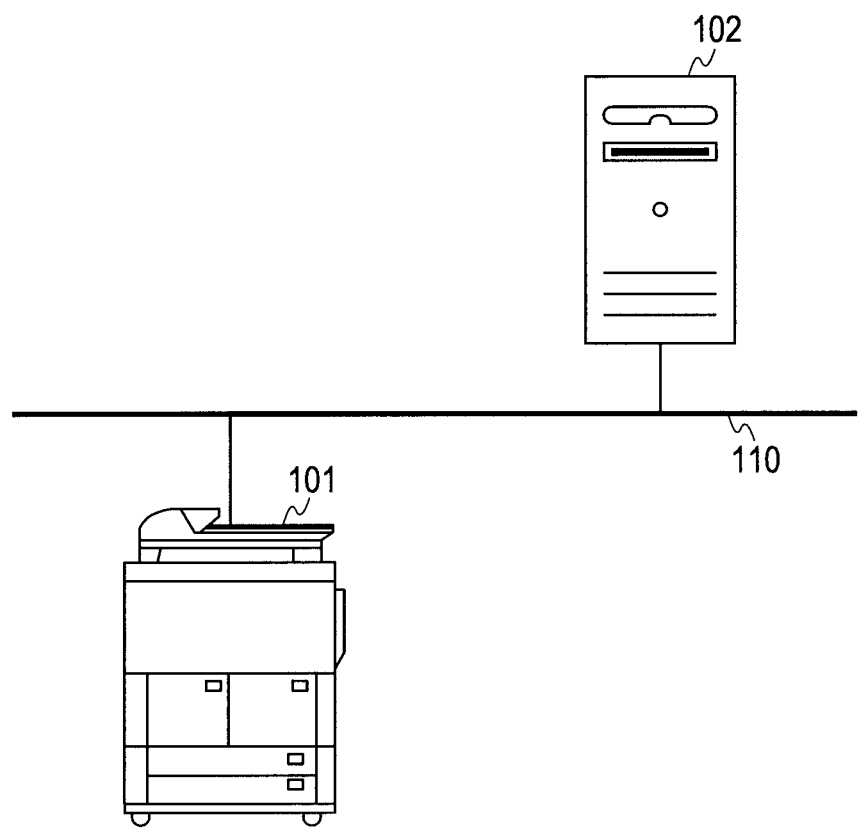
[FIG. 1]

FIG. 1 is a diagram illustrating the whole of an information processing system according to the present embodiments. An MFP 101 and a Web server 102 which can communicate with each other are connected with a LAN (Local Area Network) 110.

FIG. 2 is a block diagram illustrating a constitution of the MFP 101. A control unit 210 which includes a CPU 211 controls the operation of the whole MFP 101. The CPU 211 reads out control programs stored in a ROM 212 to perform various controls such as a read control, a transmission control and the like. A RAM 213 is used as a main memory of the CPU 211 and a temporary storage area such as a work area or the like.

An HDD (Hard Disk Drive) 214 stores image data, various programs or a various information table. An operation unit I/F 215 connects an operation unit 219 with the control unit 210. A liquid crystal display unit having a touch panel function, keyboards and the like are provided in the operation unit 219. A Web browser function to be described later is provided in the MFP 101, and a Web browser of the MFP 101 analyzes an HTML file received from the Web server 102 and displays an operation screen based on the description of the received HTML file on the liquid crystal display unit of the operation unit 219.

A printer I/F 216 connects a printer 220 with the control unit 210. Image data, which is to be printed at the printer 220, is transferred from the control unit 210 via the printer I/F 216 and is printed on a recording medium in the printer 220.

A scanner I/F 217 connects a scanner 221 with the control unit 210. The scanner 221 reads an image on an original and generates image data, which is input to the control unit 210 via the scanner I/F 217.

A network I/F 218 connects the control unit 210 (MFP 101) with the LAN 110. The network I/F 218 transmits image data or information to an external apparatus (for example, the Web server 102) on the LAN 110 or receives various information from the external apparatus on the LAN 110.

FIG. 3 is a block diagram illustrating a constitution of the Web server 102. A control unit 310 which includes a CPU 311 controls the operation of the whole Web server 102. The CPU 311 reads out control programs stored in a ROM 312 to perform various control processes. A RAM 313 is used as a main memory of the CPU 311 and a temporary storage area such as a work area or the like. An HDD 314 stores image data, various programs or a various information table to be described later.

A network I/F 315 connects the control unit 310 (Web server 102) with the LAN 110. The network I/F 315 transmits and receives various information between the network I/F 315 and another apparatus on the LAN 110.

Figure 4:
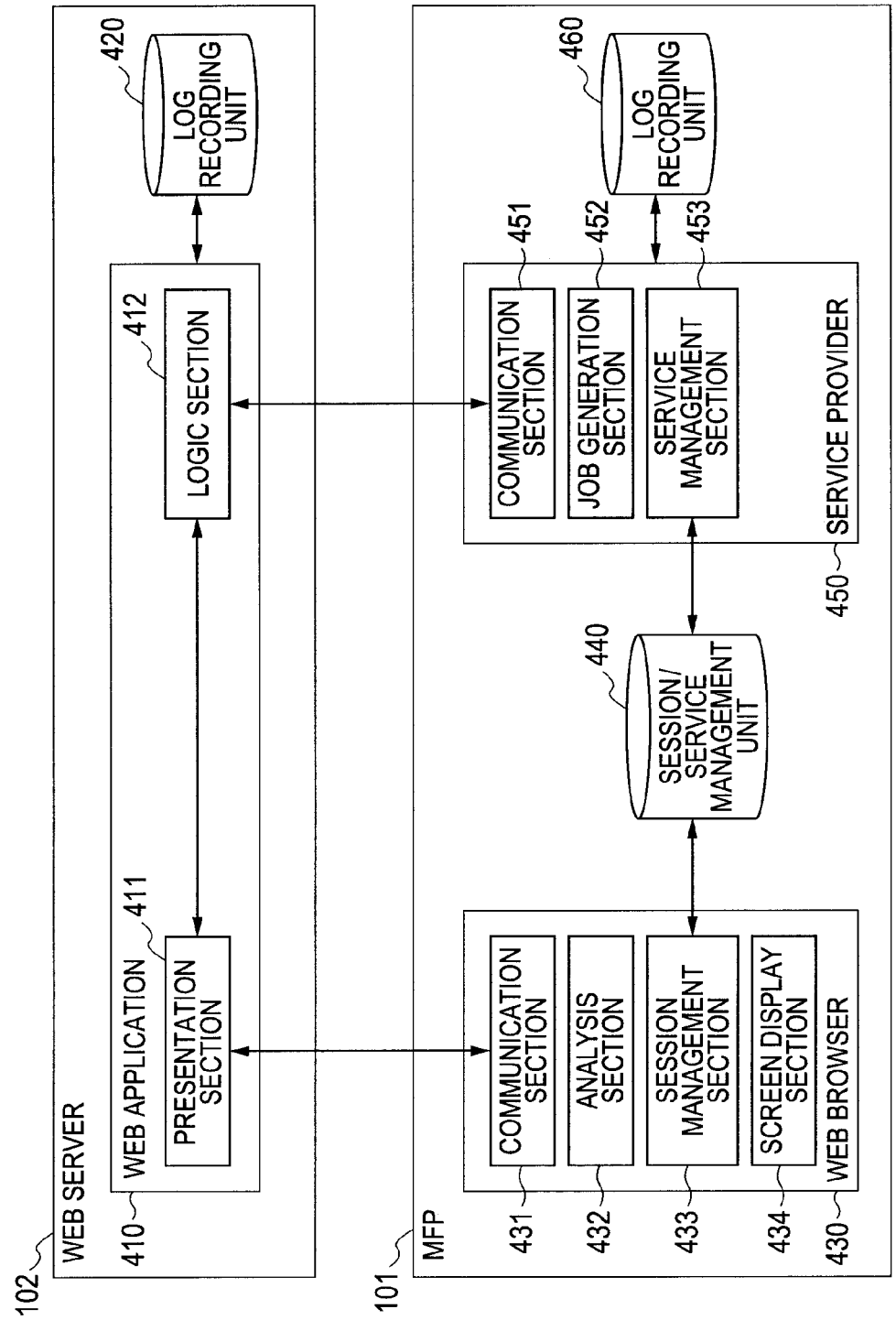
[FIG. 4]

FIG. 4 is a diagram for describing a software configuration of the whole information processing system. Functions of respective functional sections illustrated in FIG. 4 are realized by a process that the CPU 211 and the CPU 311 respectively provided in the MFP 101 and the Web server 102 perform control programs.

The MFP 101 has a Web browser 430, a session/service management unit 440, a service provider 450 and a LOG recording unit 460. Respective functions of the Web browser 430, the session/service management unit 440, the service provider 450 and the LOG recording unit 460 are realized by a process that the CPU 211 included in the MFP 101 performs control programs.

The Web browser 430 has a communication section 431, an analysis section 432, a session management section 433 and a screen display section 434. The communication section 431 communicates with a presentation section 411 of a Web application 410 in accordance with an HTTP (Hyper Text Transfer Protocol). More specifically, the communication section 431 transmits information to be input via an operation screen displayed with the Web browser 430 as a request for the Web application 410. In addition, the communication section 431 receives a response (a processed result) to be transmitted from the Web application 410.

The analysis section 432 analyzes the response received from the Web application 410. Management data such as a session ID or the like issued by the Web application 410 or HTML data is included in the response. The description of indicating the content of an operation screen to be displayed on the Web browser 430 is included in the HTML data.

The session management section 433 judges whether or not the session ID acquired by the analysis of the analysis section 432 is a newly-issued session ID. And, if it is the newly-issued session ID, this session ID is registered in the session/service management unit 440 to be described later.

The screen display section 434 displays an operation screen on the operation unit 219 on the basis of the analysis result of the HTML data analyzed by the analysis section 432.

The session/service management unit 440 manages a session ID used for uniquely identifying a session to be established between the Web browser 430 and the Web server 102. The session ID is issued by the Web server 102. In addition, the session/service management unit 440 manages a performing situation of a process requested from the Web server 102 to the service provider 450 on the basis of information transmitted from the Web browser 430 to the Web server 102 in each session. Incidentally, it is assumed that the performing situation of the process requested to the service provider 450 is called a service situation.

The service provider 450 has a communication section 451, a job generation section 452 and a service management section 453. The communication section 451 accepts a processing request from a logic section 412 in the Web application 410 to be described later. Note that a session ID indicating a session between the Web browser 430 and the Web application 410 is included in this processing request.

The job generation section 452 receives the processing request accepted by the communication section 451 and generates a job for performing the requested process and then performs the job. Furthermore, the job generation section 452 records a performed result of the job in the LOG recording unit 460.

The service management section 453 updates the service situation to be managed in the session/service management unit 440 in accordance with the performing situation of the job performed by the job generation section 452. More specifically, when it is started to perform the job, a value of the service situation corresponding to the session ID included in the processing request to be managed in the session/service management unit 440 is set to "in performance". When the performance of the job ends, a value of the service situation corresponding to the session ID included in the processing request is set to "end". As described above, a result of having performed the job or an execution LOG of application software functioning on the MFP 101 is recorded in the LOG recording unit 460.

The Web server 102 has the Web application 410 and a LOG recording unit 420. Respective functions of the Web application 410 and the LOG recording unit 420 are realized by a process that the CPU 311 included in the Web server 102 performs control programs.

The Web application 410 receives information to be transmitted from the Web browser 430 as a request and then performs a process on the basis of the received information. A processed result is transmitted from the Web application 410 to the Web browser 430 as a response.

The Web application 410 has the presentation section 411 and the logic section 412. The presentation section 411 communicates with the communication section 431 and receives a request transmitted from the MFP 101. Next, the presentation section 411 notifies the received request to the logic section 412 and waits for a response to be sent from the logic section 412. The presentation section 411, which received the response sent from the logic section 412, transmits HTML data corresponding to an operation screen to be displayed with the Web browser 430 of the MFP 101 as a response in accordance with the response content. Information which was input via the operation screen displayed on the Web browser 430 of the MFP 101 is transmitted from the communication section 431 as a request.

The logic section 412 performs various processes in accordance with the request notified from the presentation section 411 and requests to perform a process to the MFP 101. More specifically, the logic section 412 requests to perform a printing process to be performed by the printer 220 of the MFP 101, a reading process to be performed by the scanner 221 of the MFP 101 or a transmission process to be performed via the network I/F 218.

In case of requesting to perform the process to the MFP 101, the logic section 412 communicates with the communication section 451 in the service provider 450 included in the MFP 101. Then, the logic section 412 receives a result of the process performed by the MFP 101 from the MFP 101 and records the result in the LOG recording unit 420. The Web application 410 records results of various processes to be performed at the Web server 102 in the LOG recording unit 420.

Figure 5:
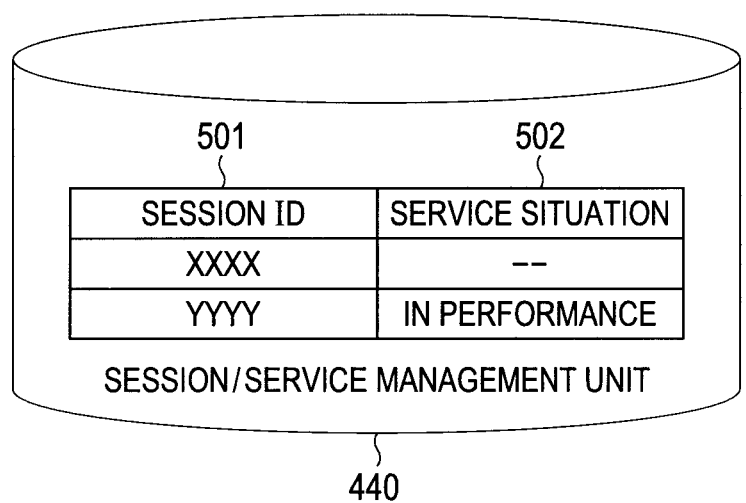
[FIG. 5]

FIG. 5 is a diagram for describing the session/service management unit 440. The session/service management unit 440 has a data base of which the constituent sections are a column "session ID" 501 and a column "service situation" 502. The session/service management unit 440 manages a session between the Web browser 430 and the Web application 410 and a performing situation of a process to be performed at the MFP 101 by associating the session with the performing situation by the column "session ID" 501 and the column "service situation" 502. That is, plural sessions and the performing situations of processes corresponding to respective sessions are managed in the session/service management unit 440 by associating the plural sessions with the performing situations.

A session ID for identifying the session between the Web browser 430 and the Web application 410 is stored in the column "session ID" 501. The session ID is issued by the Web application 410 when the Web browser 430 starts to communicate with the Web application 410. The session management section 433 of the Web browser 430 registers a newly-issued session ID included in a response sent from the Web application 410 in the column "session ID" 501.

The column "service situation" 502 indicates the performing situation of a process, which is requested from the logic section 412 of the Web application 410, performed by the service provider 450. When it is started to perform the process to be requested from the logic section 412, the service management section 453 to be described later registers a value in the column "service situation" 502 as "in performance".

At this time, the service management section 453 registers the value in the column "service situation" 502 corresponding to the column "session ID" 501 in which the session ID included in the request sent from the logic section 412 is registered. When the process ends, the service management section 453 to be described later updates the value of the column "service situation" 502 to "end".

Figure 6:
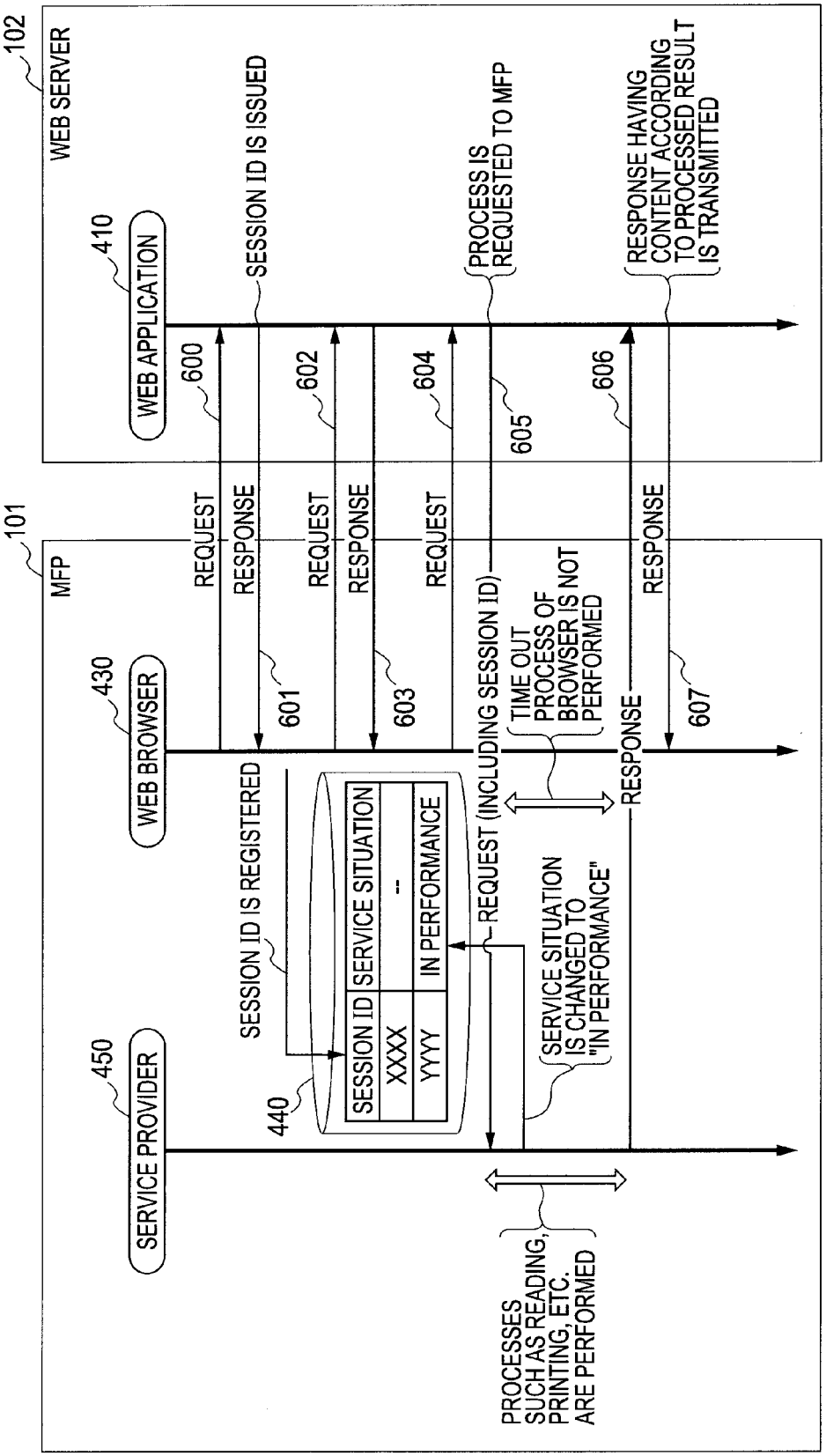
[FIG. 6]

FIG. 6 is a sequence diagram for describing an operation that the Web server 102 requests to perform the process to the service provider 450 on the basis of the request sent from the Web browser 430 and the service provider 450 performs the process.

Initially, a request 600 is transmitted from the Web browser 430 of the MFP 101 to the Web application 410 of the Web server 102. The Web application 410, which received the request 600 from the Web browser 430, issues a session ID in order to uniquely identify a subsequent series of data transmission/reception operations performed with the Web browser 430. Note that this session ID is commonly used in communications (the request 600, a response 601, a request 602, a response 603, a request 604 and a response 607) between the Web browser 430 and the Web server 102 to be described later.

Next, the Web application 410 transmits the processed result for the request together with the HTML data as the response 601 to the Web browser 430. At this time, the session I/D issued by the Web application 410 is included in the response 601 transmitted to the Web browser 430.

The Web browser 430 acquires the session I/D included in the received response 601 and registers the acquired session I/D in the column "session ID" 501 of the session/service management unit 440. Furthermore, the Web browser 430 analyzes the HTML data included in the received response 601 in the analysis section 432, and the analyzed result is displayed by the screen display section 434.

Next, the Web browser 430 transmits the next request 602 to the Web application 410 in accordance with a user operation performed on an operation screen to be displayed in the screen display section 434. The Web application 410 performs a process for the received request 602 and transmits the processed result to the Web browser 430 together with the HTML data as the response 603. The Web browser 430 and the Web application 410 repeat the foregoing communications performed by the requests and responses.

Here, FIG. 6 is a diagram for describing a case that a parameter value, which is necessary to instruct to perform a process of "transmit a file upon scanning an original" and necessary to perform the process, is included in the request 604 to be transmitted from the Web browser 430 to the Web application 410. Note that a process to be performed by the service provider 450 in the MFP 101 is not limited to the process of "transmit a file upon scanning an original" but may be another process such as a printing process or the like.

The Web browser 430 transmits the next request 604 to the Web application 410 by a user operation performed on the operation screen to be displayed in the screen display section 434. Note that information such as the parameter value necessary to instruct to perform the process and necessary to perform the process is input by a user according to a user operation performed via the operation screen. However, it is allowed that the parameter value necessary to perform the process is not always input by the user. For example, the parameter value, which is previously held in the Web application 410 itself as a default set value, may be used.

The Web application 410 which received the request 604 acquires a parameter value, which is necessary to instruct to perform the process and necessary to perform the process, included in the request 604. Next, the Web application 410 transmits a request 605 to the service provider 450 of the MFP 101 on the basis of the acquired parameter value which is necessary to instruct to perform the process and necessary to perform the process. At this time, a session I/D (I/D for identifying the session used in communication between the Web browser 430 and the Web application 410) issued by the Web application 410 is included in the request 605. According to this request 605, the Web application 410 requests to perform the process of "transmit a file upon scanning an original" for the service provider 450.

The service provider 450 which received the request 605 starts to perform the process of "transmit a file upon scanning an original" in accordance with the requested content. At this time, the service provider 450 acquires the session I/D included in the request 605. Then, a value of the column "service situation" 502 corresponding to the column "session ID" 501, in which the acquired session I/D is stored, is updated to "in performance" by referring to the column "session ID" 501 of the session/service management unit 440.

Meanwhile, the Web browser 430 calculates an elapsed time from after the request 604 is transmitted until a response sent from the Web application 410 is returned by using a timer. And, when a time out period has elapsed while the response is not returned yet, the service situation corresponding to the session I/D registered in the service/session management unit 440 is confirmed. As a result of confirmation, if the service situation is in "in performance", the Web browser 430 resets the calculated time without performing a time out process. At this time, it is acceptable that the time out process is not only performed without resetting the calculated time. Alternatively, such the constitution that the time calculation by the timer is not performed during the service situation is in "in performance" and the time calculation is started in accordance with a condition that the service situation became "end" is also acceptable.

The service/session management unit 440, which received an inquiry about the service situation from the Web server 430, responds a value stored in the column "service situation" 502 corresponding to the column "session ID" 501 in which the inquired session ID is registered.

The service provider 450 updates a value of the column "service situation" 502 corresponding to the column "session ID" 501, in which the session ID acquired from the request 605 is registered, to "end" when a process requested in the request 605 ends. Then, the service provider 450 includes the processed result in a response 606, which is sent back to the Web server 102.

The Web application 410, which received the response 606, includes the processed result included in the response 606 in the response 607 as a result for the process required in the request 604, and the response 607 is sent back to the Web browser 430.

The Web browser 430, which received the response 607, analyzes HTML data included in the response 607 and displays an analyzed result screen in the screen display section 434.

Figure 7:
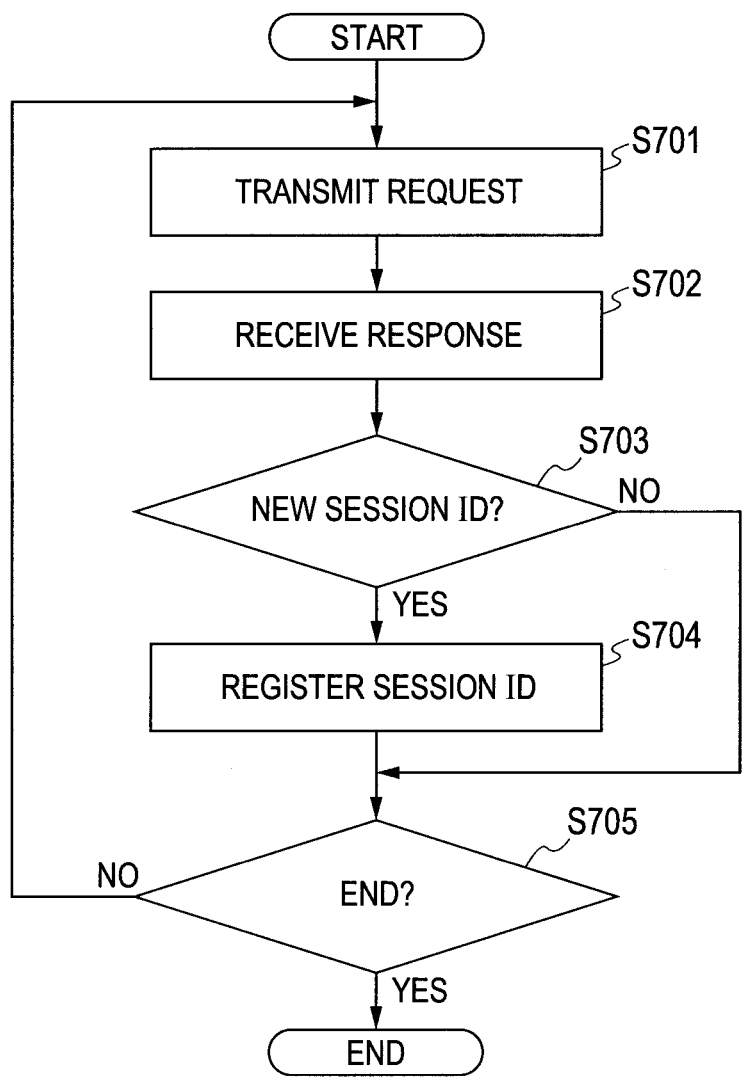
[FIG. 7]

FIG. 7 is a flowchart for describing a series of processes that the Web browser 430 of the MFP 101 registers the session ID issued by the Web application 410 in the session/service management unit 440. Respective operations (steps) indicated in the flow chart in FIG. 7 are realized by a process that the CPU 211 of the MFP 101 performs control programs stored in the HDD 214.

In S701, the communication section 431 of the Web browser 430 generates a request which includes values or the like input by a user via an operation screen displayed by the screen display section 434 and transmits the request to the Web application 410.

In S702, the communication section 431 of the Web browser 430 receives a response transmitted from the presentation section 411 of the Web application 410. The analysis section 432 of the Web browser 430 analyzes the received response and the screen display section 434 of the Web browser 430 displays the analyzed result on a screen.

In S703, the session management section 433 of the Web browser 430 confirms whether or not a session ID acquired by the analysis performed by the analysis section 432 is changed from the session ID received at the last time. When the session ID is changed from the session ID received at the last time, the session management section 433 judges that the session ID is newly issued, and the flow advances to S704. When the session ID is same as the session ID received at the last time, the session management section 433 judges that the session ID is not newly issued, and the flow advances to S705.

In the S704, the session ID, for which the session management section 433 of the Web browser 430 judged that it is newly issued in the S703, is registered in the column "session ID" 501 of the session/service management unit 440. At this time, a value of the column "service situation" 502 corresponding to the column "session ID" 501, in which the session ID was registered, is set as "- -".

In the S705, it is judged whether or not the Web browser 430 ends the process. When it is judged that the Web browser 430 does not end the process, the flow returns to the S701. On the other hand, when it is judged that the Web browser 430 ends the process, the process ends.

Figure 8:
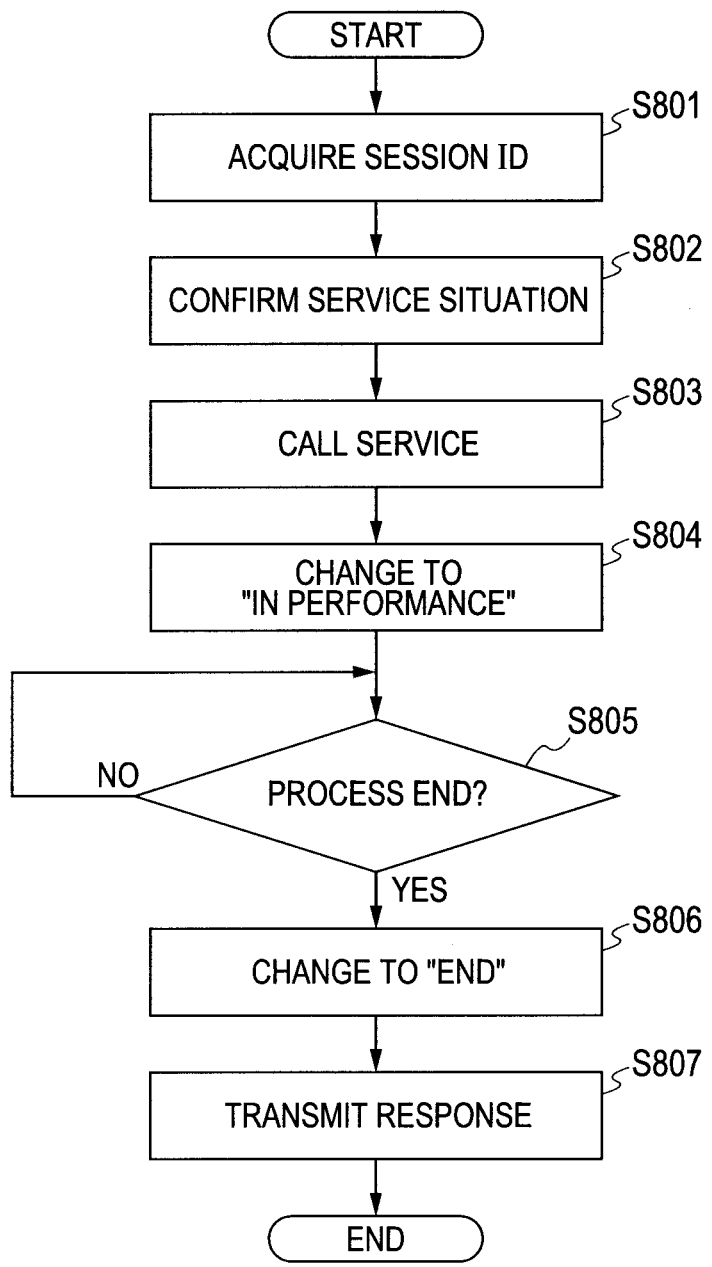
[FIG. 8]

FIG. 8 is a flowchart for describing a series of processes that the service provider 450 performs a process requested from the Web server 102. Respective operations (steps) indicated in the flow chart in FIG. 8 are realized by a process that the CPU 211 of the MFP 101 performs control programs stored in the HDD 214.

In S801, the communication section 451 of the service provider 450 receives a request (a processing request) from the logic section 412 of the Web application 410. The communication section 451, which received the request, transmits the request to the service management section 453 and the job generation section 452. The service management section 453, which received the request, acquires a session ID included in the request.

In S802, the job generation section 452, which received the request, confirms that the MFP 101 is in a state capable of performing the process requested by the request.

In subsequent S803, the job generation section 452 generates a job for performing the process requested by the request and starts to perform the job. Namely, the service is called. At this time, the job generation section 452 notifies a fact of starting to perform the job to the service management section 453.

In S804, the service management section 453, which received a notification that it was started to perform the job, updates the column "service situation" 502 corresponding to the column "session ID" 501, in which the acquired session ID is registered, to "in performance".

In S805, it is judged whether or not the process to be performed by the service provider 450 ends, and when judged that the process ends, the flow advances to S806. That is, the service is performed in S805.

In the S806, the service management section 453 updates the value of the column "service situation" 502 of the session/service management unit 440 updated in the S804 to "end" after ending the job. That is, it is judged in S806 whether or not the service ends.

Then, in S807, the communication section 451 includes the performed result of job in the response for the request received in the S801 and sends this response back to the logic section 412 of the Web application 410.

Figure 9:
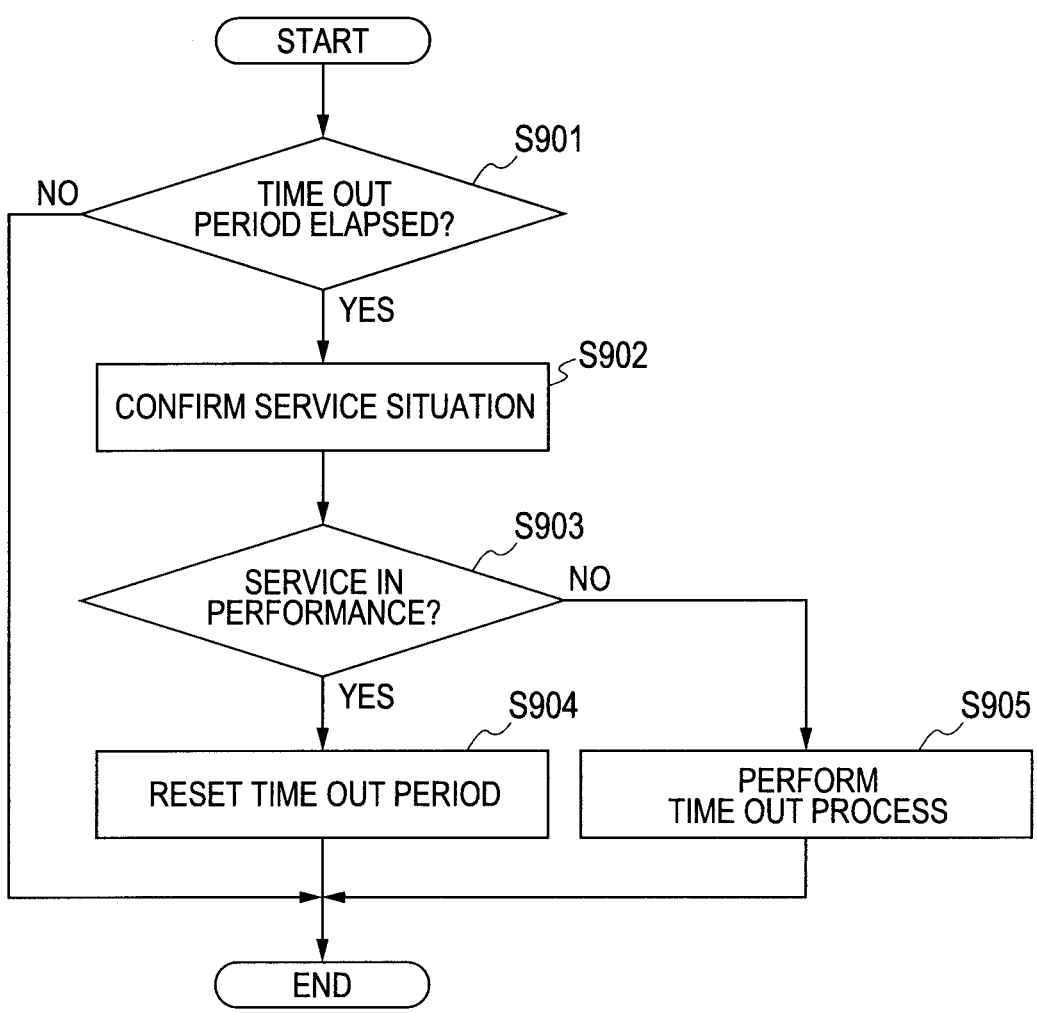
[FIG. 9]

FIG. 9 is a flow chart for describing a series of processes of confirming a performing situation of the process requested from the Web server 102 in a case that the response is not returned even though a predetermined time out period has elapsed after the Web browser 430 transmits the request to the Web server 102. Respective operations (steps) indicated in the flow chart in FIG. 9 are realized by a process that the CPU 211 of the MFP 101 performs control programs stored in the HDD 214.

In S901, the session management section 433 of the Web browser 430 judges whether or not the predetermined time out period has elapsed without the response for the transmitted request. When the time out period has elapsed, the flow advances to S902. When the time out period does not elapse, the process ends.

In S902, the session management section 433 confirms a value of the column "service situation" 502 corresponding to the column "session ID" 501 in which the session ID of the time out generated session is registered.

In S903, if the value of the column "service situation" 502 confirmed by the session management section 433 in the S902 is "in performance", the flow advances to S904. If the value of the column "service situation" 502 confirmed in the S902 is "- -" or "end", the flow advances to S905.

In the S904, the session management section 433 resets a time, when it is started to calculate a time period after transmitting the request to the Web server 102. Herewith, even when the time out period has elapsed without the response, the Web browser 430 keeps not to perform a time out process of the Web browser 430 if the process at the MFP 101 side requested from the Web server 102 is in a performing state.

Meanwhile, in the S905, the session management section 433 performs the time out process. More specifically, by discarding the session established between the Web browser 430 and the Web server 102, thereafter, even if the Web browser 430 receives the response which has the same session ID as that of the discarded session, the Web browser 430 disregards (discards) the response as an ineffective response. The screen display section 434 displays a message which indicates a fact that a time out error was generated. As just described, the time out process is such a process of invalidating the transmitted request. Incidentally, as a process of invalidating the transmitted request, it is allowed that not only the session itself is discarded but also it is stopped to wait for the response for the transmitted request and a state capable of transmitting a new request is only set.

As described above, in the present embodiment, after the Web browser transmits a request to the Web server, when the predetermined time out period has elapsed while the response from the Web server is not returned yet, it is judged whether or not a process based on the request from the Web server is in a performing state. And, if the process based on the request from the Web server is not in a performing state, the transmitted request is invalidated, and if the process based on the request from the Web server is in a performing state, the transmitted request is kept not to be invalidated. Accordingly, even if it is constituted that the Web server provides an operation screen of the MFP, the processed result can be more surely notified to a user.

[Second Embodiment]

Subsequently, the second embodiment of the present invention will be described. In the second embodiment, in addition to the constitution described in the first embodiment, the constitution that the Web browser 430 is made to perform a time out process when the service provider 450 can not return the response (processed result) to the Web server is further added. Note that the same constitutions as those in the above-described first embodiment will be denoted by the same reference numerals and the detailed description thereof will be omitted.

Figure 10:
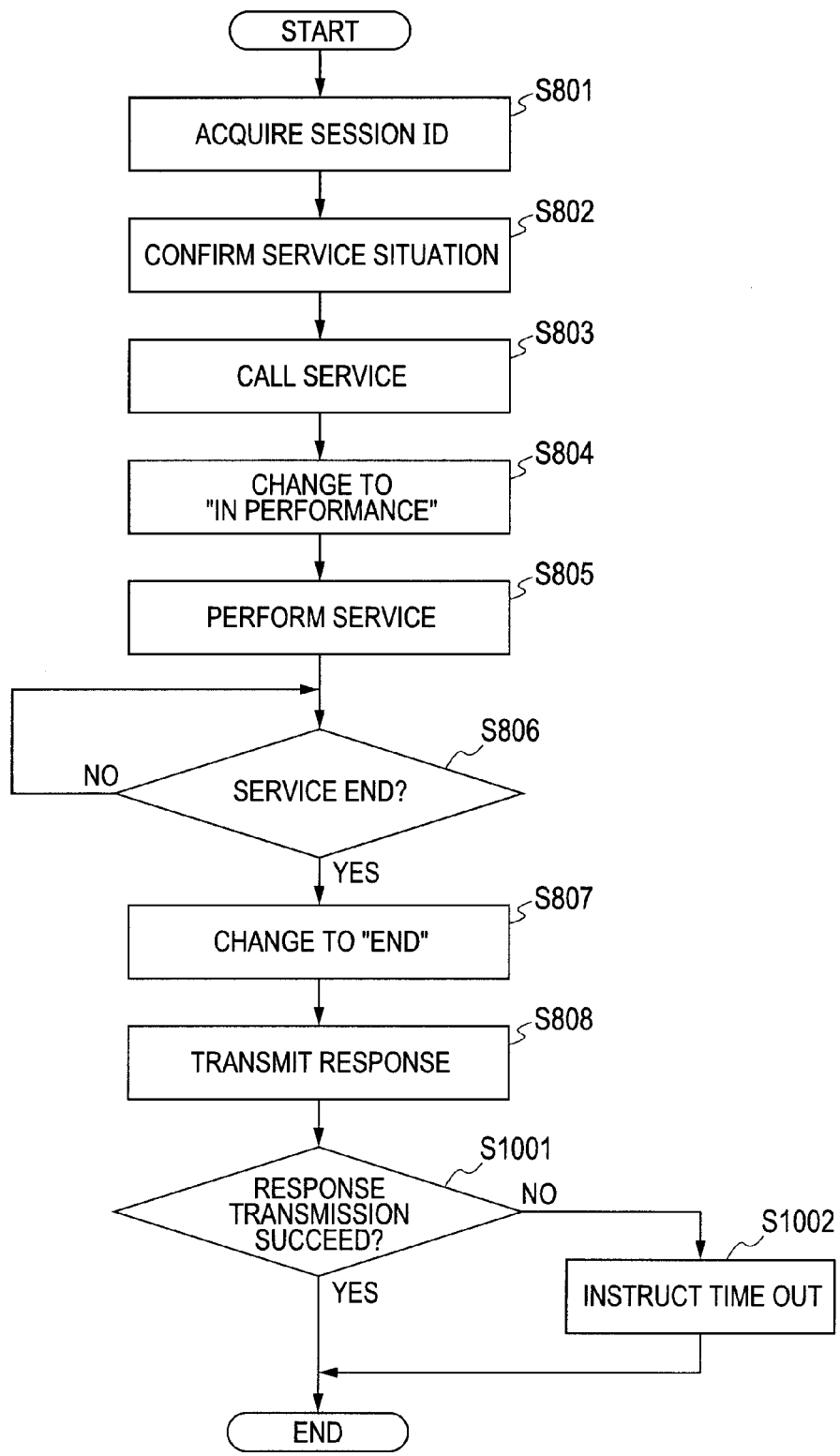
[FIG. 10]

FIG. 10 is a flow chart for describing a series of processes that the service provider 450 performs a process requested from the Web server 102. Respective operations (steps) indicated in the flow chart in FIG. 10 are realized by a process that the CPU 211 of the MFP 101 performs control programs stored in the HDD 214.

In the flow chart indicated in FIG. 10, processes of S1001 and S1002 are added to the processes in the flow chart indicated in FIG. 8.

In the S1001, the communication section 451 of the service provider 450 confirms whether or not the transmission of response to the logic section 412 of the Web application 410 was resulted in success. When the transmission of response is resulted in success, the process ends, and when the transmission of response is resulted in failure, the flow advances to the S1002. In the S1002, the time out process is instructed to the session management section 433 of the Web browser 430.

Figure 11:
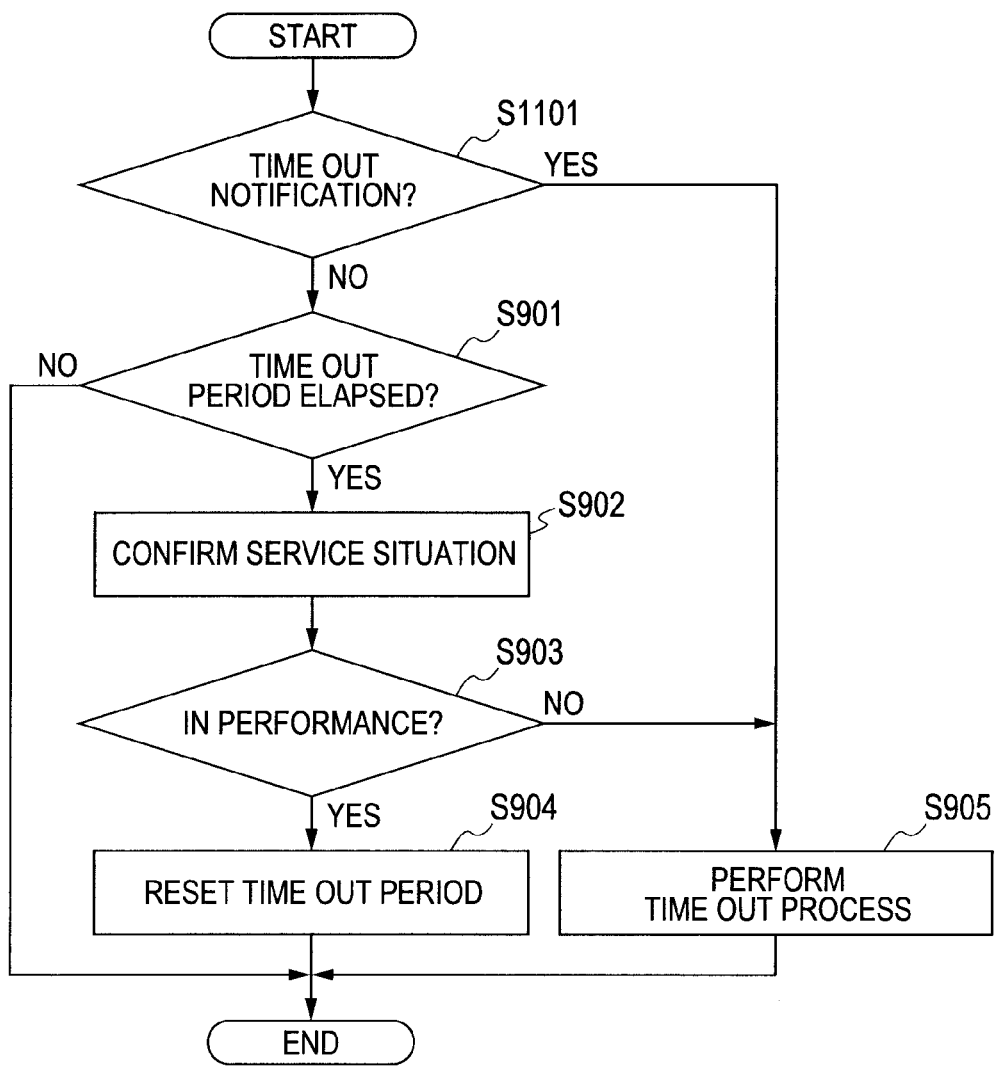
[FIG. 11]

FIG. 11 is a flow chart for describing a series of processes of confirming a performing situation of a process requested from the Web server 102 in a case that the response is not returned even though a predetermined time out period has elapsed after the Web browser 430 transmits a request to the Web server 102. Respective operations (steps) indicated in the flow chart in FIG. 11 are realized by a process that the CPU 211 of the MFP 101 performs control programs stored in the HDD 214.

In the flow chart indicated in FIG. 11, a process of S1101 is added to the processes in the flow chart indicated in FIG. 9.

In the S1101, the session management section 433 of the Web browser 430 judges whether or not a time out instruction is received from the service provider 450. When it is judged that the time out instruction was received, the flow advances to the S905, and when it is judged that the time out instruction is not received, the flow advances to the S901.

In the S905, the session management section 433 performs the time out process. More specifically, by discarding the session established between the Web browser 430 and the Web server 102, thereafter, even if the Web browser 430 receives the response which has the same session ID as that of the discarded session, the Web browser 430 disregards (discards) the response as an ineffective response. The screen display section 434 displays a message which indicates a fact that a time out error was generated. As just described, the time out process is such a process of invalidating the transmitted request. Incidentally, as a process of invalidating the transmitted request, it is allowed that not only the session itself is discarded but also it is stopped to wait for the response for the transmitted request and a state capable of transmitting a new request is only set.

As described above, in the present embodiment, for example, when a network trouble occurs after receiving a processing request from Web server and the service provider became unable to return the response to the Web server, the session between the Web browser and the Web server is discarded. According to this fact, in addition to an effect described in the first embodiment, it can be prevented that the session between the Web browser and the Web server is unnecessarily and continuously held.

[Other Embodiment]

Aspects of the present invention can also be realized by a computer of a system or apparatus (or devices such as a CPU or an MPU) that reads out and executes a program recorded on a memory device to perform the functions of the above-described embodiments, and by a method, the steps of which are performed by a computer of a system or an apparatus by, for example, reading out and executing a program recorded on a memory device to perform the functions of the above-described embodiments. For this purpose, the program is provided to the computer for example via a network or from a recording medium of various types serving as the memory device (e.g., a computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-151480, filed Jun. 25, 2009, which is hereby incorporated by reference herein in its entirety.

The invention claimed is:

1. An information processing apparatus, which communicates with a Web server and includes a Web browser for displaying an operation screen provided by the Web server, comprising:
    a transmission unit configured to transmit a request to the Web server on the basis of a user operation performed through the operation screen displayed on the Web browser;
    a processing unit configured to, in a case where it is requested by the Web server to perform a process on the basis of the request transmitted by the transmission unit, perform the requested process; and
    a control unit configured to, while the processing unit is performing the process requested by the Web server, not invalidate the request transmitted by the transmission unit, and to, while the processing unit is not performing the process requested by the Web server, invalidate the request transmitted by the transmission unit according to that there is no response from the Web server and a predetermined time out period elapses after the transmission unit transmits the request.

2. An information processing apparatus according to claim 1, wherein the control unit invalidates the request in, among plural sessions established between the Web browser and the Web server, the session that the predetermined time out period has elapsed.

3. An information processing apparatus according to claim 1, further comprising:
    a management unit configured to manage a session ID for identifying a session established between the Web browser and the Web server and a performing situation of the process corresponding to the session ID, as associating the session ID and the performing situation with each other; and
    a registration unit configured to register the session ID issued by the Web server in the management unit.

4. An information processing apparatus according to claim 1, further comprising a notification unit configured to notify the Web server of a result of the process performed by the processing unit, wherein, in a case where the notification unit cannot perform the notification, the control unit invalidates the request transmitted by the transmission unit.

5. An information processing apparatus according to claim 1, wherein the processing unit includes at least a reading unit configured to read an image on an original and generate image data based on the read image or a printing unit configured to perform printing based on the generated image data.

6. A control method executed by an information processing apparatus which communicates with a Web server and includes a Web browser for displaying an operation screen provided by the Web server, the control method comprising:

transmitting a request to the Web server on the basis of a user operation performed through the operation screen displayed on the Web browser;

performing, in a case where it is requested by the Web server to perform a process on the basis of the transmitted request, the requested process; and a control step of not invalidating, while the process requested by the Web server is being performed, the transmitted request, and invalidating, while the process requested by the Web server is not being performed, the transmitted request according to that there is no response from the Web server and a predetermined time out period elapses after the transmission of the request.

7. A non-transitory computer readable storage medium storing computer-executable code of a program for causing a computer to perform the control method as described in claim 6.

* * * * *